(12) United States Patent
Petropoulos et al.

(10) Patent No.: US 7,860,877 B2
(45) Date of Patent: Dec. 28, 2010

(54) RECONFIGURABLE QUERY GENERATION SYSTEM FOR WEB BROWSERS

(75) Inventors: Michail A. Petropoulos, La Jolla, CA (US); Vasilis Vassalos, La Jolla, CA (US); Ioannis Papakonstantinou, La Jolla, CA (US)

(73) Assignee: Oracle International Corporation, Redwood Shores, CA (US)

( * ) Notice: Subject to any disclaimer, the term of this patent is extended or adjusted under 35 U.S.C. 154(b) by 361 days.

(21) Appl. No.: 11/689,923

(22) Filed: Mar. 22, 2007

(65) Prior Publication Data

US 2007/0162439 A1 Jul. 12, 2007

Related U.S. Application Data

(63) Continuation of application No. 09/819,180, filed on Mar. 27, 2001, now Pat. No. 7,203,678.

(51) Int. Cl.
*G06F 7/00* (2006.01)
(52) U.S. Cl. .................. 707/759; 707/707; 707/779; 707/765
(58) Field of Classification Search ............. 707/4, 707/707, 759, 765, 779
See application file for complete search history.

(56) References Cited

U.S. PATENT DOCUMENTS

| 6,708,186 | B1* | 3/2004 | Claborn et al. ............ 707/102 |
| 6,810,429 | B1* | 10/2004 | Walsh et al. ............... 709/246 |
| 6,920,607 | B1* | 7/2005 | Ali et al. .................... 715/206 |
| 7,483,983 | B1* | 1/2009 | Bonefas et al. ............ 709/226 |
| 2002/0049749 | A1* | 4/2002 | Helgeson et al. .............. 707/3 |
| 2002/0120685 | A1* | 8/2002 | Srivastava et al. .......... 709/203 |
| 2002/0133516 | A1* | 9/2002 | Davis et al. ................ 707/513 |

OTHER PUBLICATIONS

Chamberlin et al. "Quilt: An XML query language for heterogeneous data Sources", copyright Springe-Verlag Berlin Heideberg Jan. 1, 2001.*

* cited by examiner

*Primary Examiner*—Apu M Mofiz
*Assistant Examiner*—Cindy Nguyen
(74) *Attorney, Agent, or Firm*—Squire, Sanders & Dempsey, LLP

(57) ABSTRACT

A reconfigurable web-browser compatible data query system. The invention provides an XML platform enabling web-based forms that query data modeled by data schemas. This platform comprises a collection of query form controls, an annotation scheme for attaching these controls to the data schema, a compiler for creating a web-browser-compatible representation of the query form, and a run-time engine for constructing queries against the data and rendering query results.

20 Claims, 11 Drawing Sheets

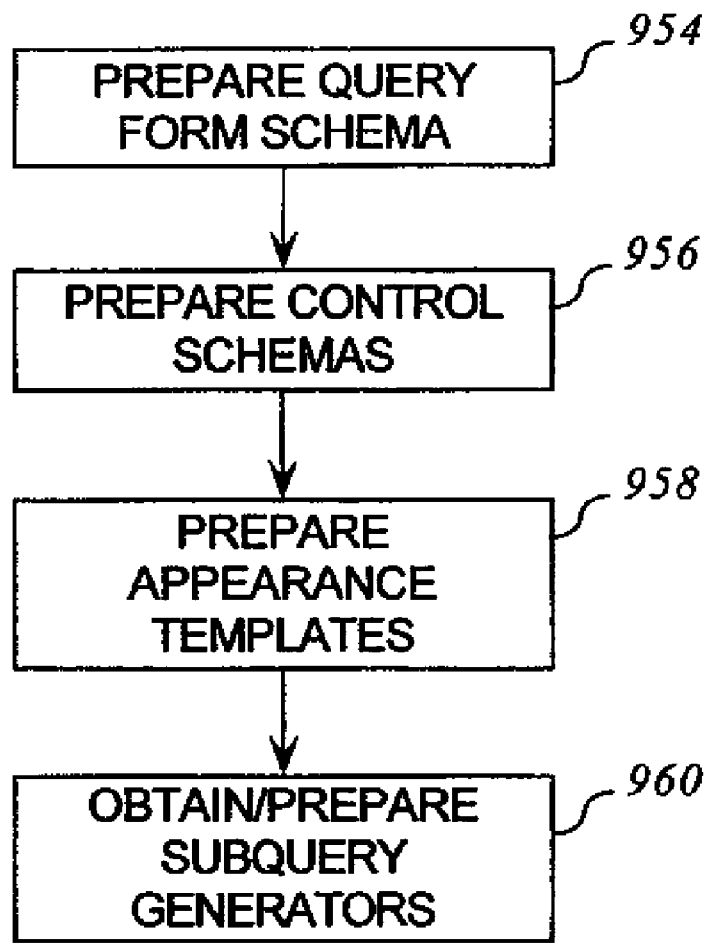

RECONFIGURABLE QUERY GENERATION SYSTEM FOR WEB BROWSERS

CLAIM OF PRIORITY

This application is a continuation of U.S. patent application Ser. No. 09/819,180 entitled RECONFIGURABLE QUERY GENERATION SYSTEM FOR WEB BROWSERS, inventors Michail Petropoulos, et al., filed Mar. 27, 2001, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to computer-executed data queries. More particularly, the invention concerns a reconfigurable, web-browser-compatible system for conducting data queries. The system dynamically generates web-browser-compatible query form pages by utilizing user-reconfigurable query form controls defining query logic, HTML templates defining presentation of each query form control, and subquery generators implementing the query behavior of each query form control. Reconfigurable query form annotations determine which query form controls make up each particular web-browser-compatible query form page. This system aids in (1) assembling appropriate query instructions based on user-submitted values, and (2) rendering query results via web browser back to the user.

2. Description of the Related Art

Due to the advent of computers, we are confronted with an ever-increasing amount of electronic data. Computers also provide the most effective tool for organizing this data and searching for items of interest. Indeed, computer data queries save countless hours of human endeavor by rapidly searching enormous machine-readable databases for user-specified data.

Web-page designers traditionally allow for users' data queries by preparing a query form suitable to the nature of the expected queries. Such query forms are typically prepared by generating a number of hypertext markup language (HTML) elements that appear in the overall web page design. Cooperatively, these HTML elements represent the query form. One such example is the United States Patent and Trademark Office web site, which provides a patent search facility at http://164.195.100.11/netahtml/search-bool.html.

After the user completes the query form on-screen, the user operates his/her web browser to transmit the query parameters to the host web server. Other programming at the host, separate from the HTML components that visually present the query form, receives the user's query parameters, generates representative query instructions in an appropriate language such as structured query language (SQL), executes the query instructions, and controls the graphic presentation of the query results to the user.

In many cases, the foregoing approach provides a satisfactory solution, at least initially when the web page is first placed on-line. However, time often reveals a need to provide users with additional, different, or more powerful queries than those contemplated by the web site's initial query forms. Unfortunately, the seemingly simple task of redesigning these query forms involves significant time and labor because of the need to write, implement, and test (1) HTML code to define the new query form, (2) programming to generate and execute the appropriate query instructions based upon the new, user-completed query form, and (3) programming to visually present results of the new query format back to the user. In some cases, these difficulties provide a strong disincentive to improve the web site's search capabilities, and users are stuck with weak or outdated query facilities.

Consequently, known web-based data query facilities are not completely adequate for some applications due to certain unsolved problems.

SUMMARY OF THE INVENTION

Broadly, the invention concerns a reconfigurable, web-browser-compatible system for conducting data queries. In one example, the system provides an XML platform enabling web-based forms that query data modeled by XML schemas. The system dynamically generates web-browser-compatible query form pages by utilizing user-reconfigurable query form controls defining query logic, appearance templates defining presentation of each query form control, and subquery generators implementing the query behavior of each query form control. Reconfigurable query form "annotations" determine which query form controls make up each particular web-browser-compatible query form page. This system assembles appropriate query instructions based on user-submitted values, and renders query results back to the user via the web browser interface.

The platform includes a number of query form "controls" each defining the web-browser appearance and operation of a different facility for receiving user input of one or more query input parameters. The platform also includes numerous query form annotations, each specifying the content of a query form page by invoking one or more query form controls and specifying their interrelationship. Each query form annotation includes a query input component (comprising selection of multiple controls and their relation to the data schema), and a query results component (comprising selection of the elements of the data schema to be presented in the results of the query). The query form controls and annotations may, for example, be intended for custom development by personnel that implement the system according to their own particular data, expected users, etc.

The platform also includes a number of schemas. One is a data schema defining requisite attributes of data to be queried. Another schema is a control schema defining the requisite attributes of compliant query form control. Still another schema is a query form schema defining the requisite attributes of query form annotations. Thus, the body of data to be queried provides an instance of the data schema, different controls provide instances of different control schemas, and the query form annotations provide instances of the query form schema. In one embodiment, these various schemas may be pre-prepared by the manufacturer, with the intention of serving as guidelines for software developers to later implement the query forms of the desired structure and content pertaining to their desired applications.

The platform also includes numerous appearance templates each providing computer executable code to define the web-browser appearance of a different query form control. Various subquery generators are also provided, each subquery generator comprising a sequence of computer-executable code corresponding to a different query form control, and serving to generate query instructions implementing the control's functionality or "logic." In the illustrated embodiment, the appearance templates and subquery generators are pre-prepared by the manufacturer, for use as a foundation for software developers to implement query forms of the desired structure and content pertaining to their desired applications.

Various software engines operate upon the data and programming constructs described above, serving to implement the web-based query system of the invention. More particularly, the system includes a compiler to generate computer-readable code for visually presenting query form pages. For each query form page to be generated, the compiler utilizes a corresponding query form annotation (i.e., an instance of the query form schema) as a guide to compile appearance templates associated with query form controls identified by that query form annotation. The computer also prepares initialization code to initialize the subquery generators necessary to the controls invoked by the current query form annotation. A run-time engine includes a query assembler and a rendering engine. The query assembler invokes the proper subquery generators (according to the initialization code) to assemble and submit machine-readable query requests to a data server, which executes the specified query upon the data. The rendering engine receives query results and formats them for web-browser presentation to the user.

With the foregoing structure in mind, operation of the system is described in the context of four phases: design, develop, compile, and run. In the present example, design operations are performed by the manufacturer, which provides a software package including the platform with intent for the purchaser to complete and implement the platform according to the purchaser's own requirements, these subsequent steps constituting the "develop" phase discussed below. Alternatively, some or all design operations may be performed by the developer, in case the designing and developing entities are one and the same. At design time, designers prepare the data schema, query form schema, control schema, appearance templates, and subquery generators.

At develop time, developers design query form pages for web-browser presentation and operation by intended users. This is achieved by tailoring the platform to their intended use. Namely, developers create the desired controls (instances of the control schema) and query form annotations (instances of the query form schema).

When the develop phase has been completed, the developers activate the compiler to generate "completed query form pages." The completed query form pages comprise computer-readable instructions (such as HTML code) for making web-browser presentations as directed by the query form annotations. The compiler uses the query form annotations as guides to compile appearance templates associated with controls invoked by that annotation. For each query form annotation, the compiler also prepares code to initialize the subquery generators called by the controls invoked by that annotation.

After the compile process completes, the system is ready to conduct run-time operations. At run time, a web server makes the completed query form pages available to users' web browsers, such as through the Internet, company Intranet, network, shared storage, etc. Namely, responsive to user request for a completed query form page, the web server transmits the requested page to the user's web browser. The user completes the onscreen query form, and operates his/her web browser to submit the parameters of the intended query back to the server. The server forwards the completed query form page to the query assembler, which invokes the previously initialized subquery generators appropriate to the relevant query form annotation to assemble a machine-readable query request representative of the user's submitted query parameters. The data server receives the assembled query request from the assembler, and executes it upon the body of data. The rendering engine receives the query results from the data server, and prepares appropriate instructions for use by the web server to present the query results to the user via web browser.

The foregoing features may be implemented in a number of different forms. For example, the invention may be implemented to provide a method to configure and operate a reconfigurable, web-browser compatible data query system. In another embodiment, the invention may be implemented to provide an apparatus such as a reconfigurable, web-browser compatible data query system. In still another embodiment, the invention may be implemented to provide one or more storage media tangibly embodying a program of machine-readable instructions executable by a digital data processing apparatus to operate a reconfigurable, web-browser compatible data query system. Another embodiment concerns logic circuitry having multiple interconnected electrically conductive elements configured to operate a reconfigurable, web-browser compatible data query system.

The invention affords its users with a number of distinct advantages. For example, this system benefits the web site operator by simplifying the procedure to add new query forms (or modify existing forms). Namely, developers need only add (or change) a query form annotation and then recompile the annotation, relying on the previously constructed infrastructure including controls, subquery generators, appearance templates, and schema. For this reason, the web site operator can avoid time-consuming reprogramming of code to assemble appropriate query instructions based on user-submitted answers to the query form, and rendering results of query execution back to the user.

The present invention delivers rich functionality while providing significant reduction in web site development and maintenance costs, since the query construction and the result formatting are automated, and the separation of form content, structure and presentation decouples web design from the form development. Also, the invention allows increasingly complex queries because the developer can add more controls, subquery generators, and appearance templates to the system. Another advantage is that the system offers great flexibility in selecting query conditions to impose upon the data. This is possible because the controls can be combined on the form in arbitrary ways, each allowing the generation of different selection conditions. Similarly, the invention offers the use of arbitrary sorting conditions. Still another advantage of this invention is that it enables developers to define dependencies between query conditions on the form because the controls specified in the query form annotation can be defined as dependent on other controls.

The invention also provides a number of other advantages and benefits, which should be apparent from the following description of the invention.

BRIEF DESCRIPTION OF THE DRAWINGS

FIG. 9A is a flowchart showing a design process.

DETAILED DESCRIPTION

The nature, objectives, and advantages of the invention will become more apparent to those skilled in the art after considering the following detailed description in connection with the accompanying drawings.

Hardware Components and Interconnections

Data Query Environment—Introduction

Figure 1:
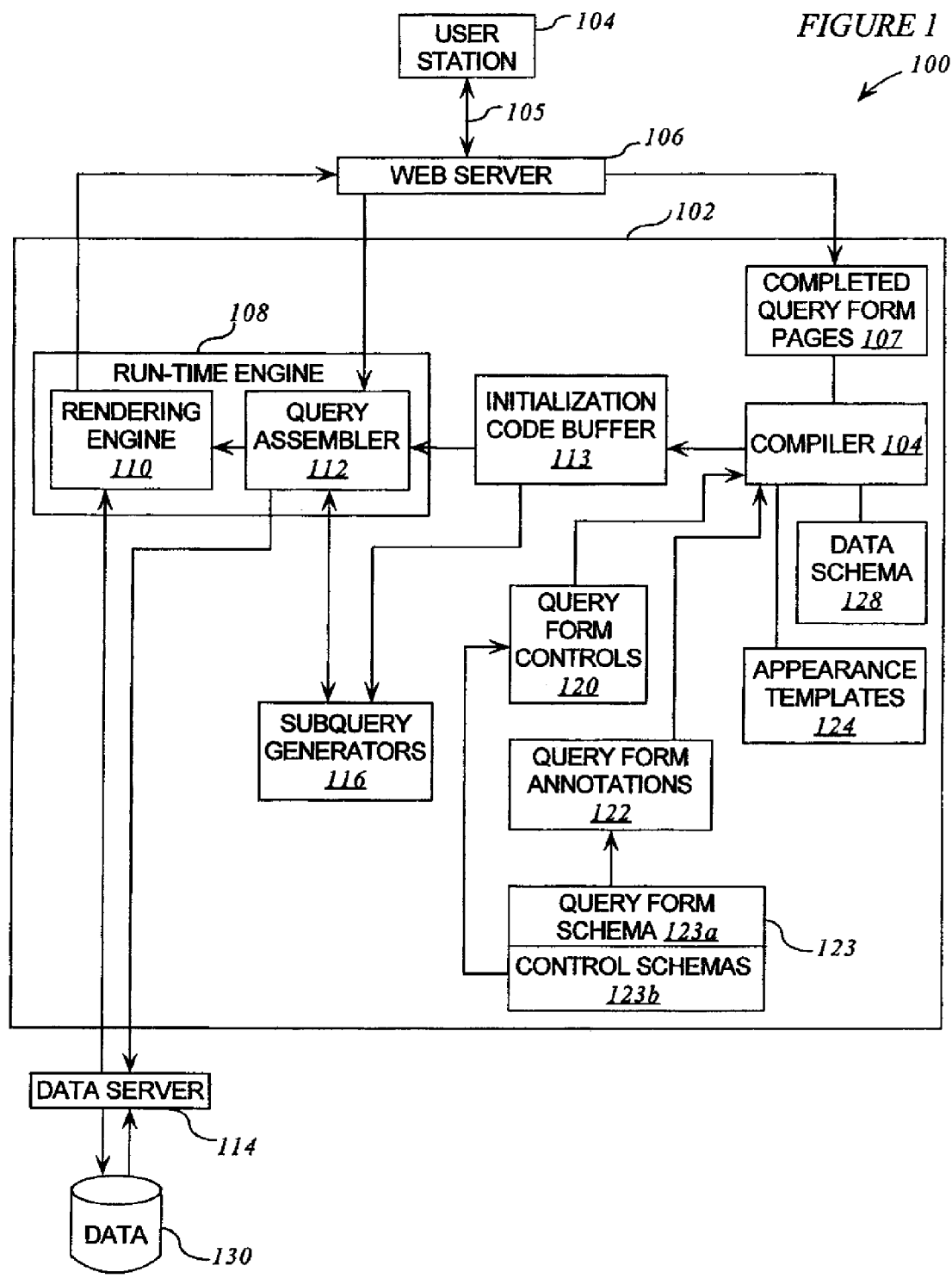
FIG. 1 is a block diagram of the hardware components and interconnections of a query processing system.

FIG. 1 shows an exemplary environment 100 for practicing the present invention. The environment 100 includes a user station 104, web server 106, query platform 102, and a body of data 130. The platform 102 enables an operator of the user station 104 to perform powerful yet convenient computer-directed queries of the data 130.

User Station

The user station 104 comprises a computer that includes a web browser operable by a human user (not shown). The user station 104 may also be referred to as a web browser 104. Without any intended limitation, the web browser may be embodied by products such as MICROSOFT EXPLORER, NETSCAPE NAVIGATOR, or another software product that utilizes hypertext markup language (HTML), Wireless Markup Language (WML), eXtensible Markup Language (XML), or another markup language. For ease of discussion, the illustrated web browser 104 utilizes HTML. Furthermore, as operation of the invention with non-HTML markup languages will be apparent to ordinarily skilled artisans having the benefit of this disclosure, such non-HTML embodiments are omitted to ease comprehension and simplify disclosure.

Web Server

The server 106 presents HTML data to the web browser 104 in accordance with the user's operation of the web browser. When the user directs the web browser 104 to view web pages of enhanced query functionality according to the present invention, the server 106 obtains the requested query form page from the platform 102, and more particularly from a buffer of completed query form pages 107. The server 106 also collects data from the user's completion of query form pages at the user station, and returns such information to the platform 102. In the illustrated example, the server 106 comprises a JavaServer Page (JSP) web engine.

The server 106 is coupled to the user station 104 by a link 105, such as an Internet connection, company Intranet, network, cables, fiber optic line, wireless link, local area network, wide area network, or any other suitable connection. The server 106 is also coupled to the platform 102, and more particularly the run-time engine 108 and buffer of completed query forms 107, for reasons discussed below.

Data

As mentioned above, the platform 102 is designed to conduct queries aimed at the data 130. The data 130 comprises a body of data that is stored in one or multiple digital data storage devices such as direct access storage (e.g., a conventional "hard drive," redundant array of inexpensive disks ("RAID"), or other direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), paper "punch" cards, etc.

The data 130 may comprise a collection of data such as one or multiple different databases, whether the databases are "homogeneous" or not. Homogeneity refers to databases that are described by the same schema, represented in the same model, and stored in the same form. As a specific example, without any intended limitation, contents of the data 130 may optionally be stored in the form of XML code. The data 130 contains many different "entries," where an entry comprises a record, row, object, document, file or any other useful construct.

Coupled to the data 130 is a data server 114. The data server 114 comprises a digital data processor that receives queries prepared by the platform 102, and executes them upon the database 130. Depending upon the needs of the application, the data server 114 may be implemented as a machine separate from the platform 102, or incorporated into the platform 102. In the presently illustrated example, the data server 114 is shown separate from the platform 102. In this example, the data server 114 comprises a computing machine programmed to receive query statements in XML Catalog Query Language (XCQL) from the query assembler 112, and thereafter execute these query statements upon the data 130.

Platform—Introduction

Generally, the platform 102 enables the use of web-based forms that query data modeled by XML schemas. In one example, the platform 102 is implemented by a general purpose digital data processor such as a personal computer (PC), computer workstation, mainframe computer, computer server, or other computing device. Although the platform 102 may share hardware with other components such as the web server 106, data server 114, and data 130, the platform 102 may be separately constructed if desired.

The platform 102 includes a data infrastructure along with various software modules that utilize the data infrastructure. The data infrastructure includes the following:

1. Data schema 128, which describes contents of the data 130.

2. Collection of query form controls 120, each query form control contributing a part of a query, such as a range condition, ordering condition, equality condition, inequality condition, multi-selection condition, etc.

3. Control schemas 123b, each providing a paradigm for a different variety of the controls 120.

4. Appearance templates 124, specifying visual appearance of each control upon the web browser 104.

5. Subquery generators 116, specifying computer-readable code for generating query instructions corresponding to each control.

6. Query form annotations 122, each specifying the content of a query form page by invoking one or more query form controls and specifying their interrelationship. Each query form page includes a query input component (comprising selection of multiple controls and their relation to the data schema), and a query results component (comprising selection of the elements of the data schema to be presented).

7. Query form schema 123a providing a paradigm for the query form annotations 122. As an alternative to this and the foregoing schema, other constructs may be used such as document type definitions (DTDs) etc.

The foregoing data infrastructure components provide building blocks for use by various software modules in generating query form pages for presentation by the web browser 104, executing queries described by user completion of such query form pages, and presenting query results to the web browser 104. Chiefly, these software modules include a compiler 104 for creating an HTML representation of the query form, and a run-time engine 108 to construct queries against the data and render query results.

Platform—Data Schema

Figure 4:
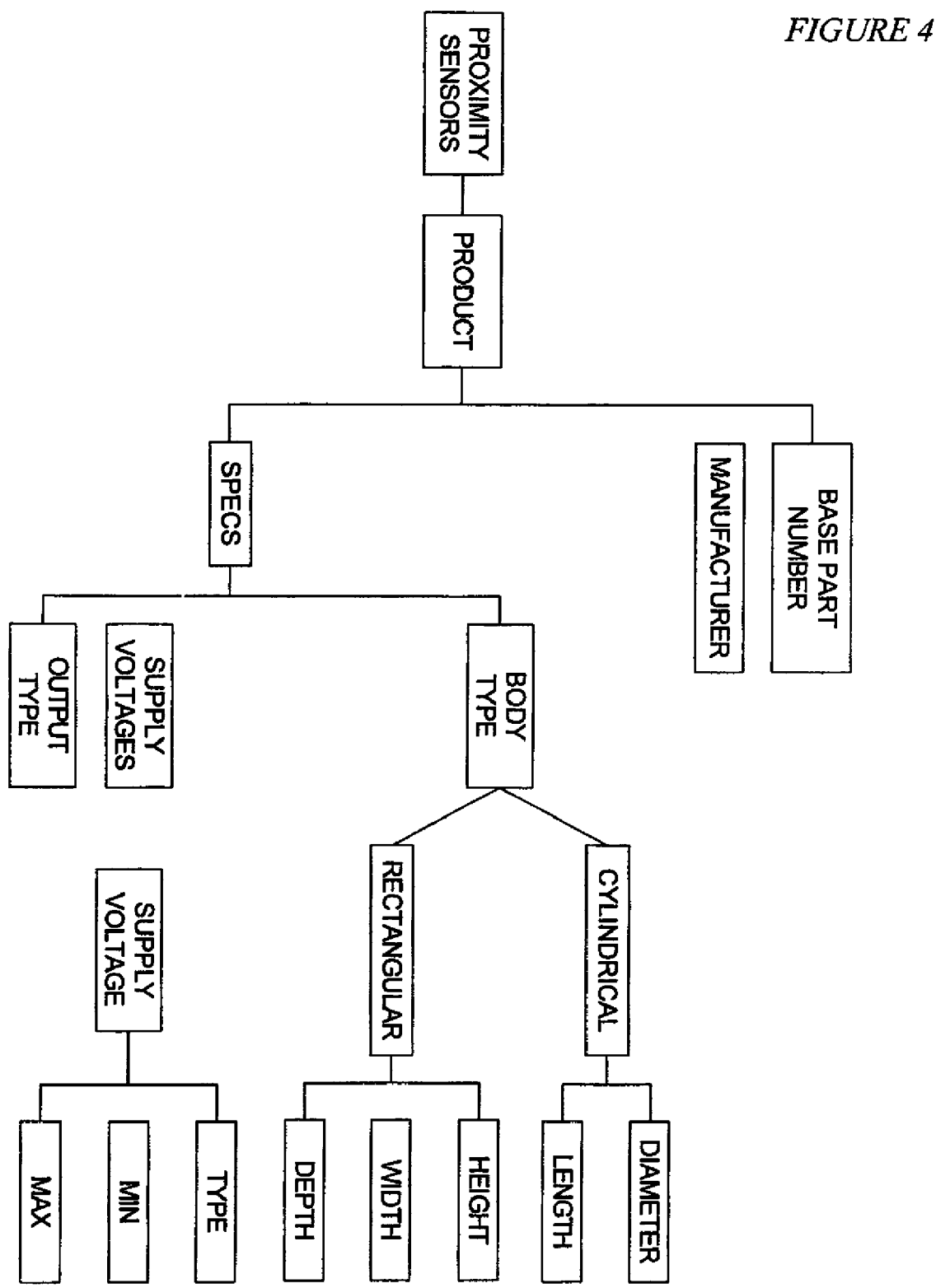
FIG. 4 is a diagram illustrating an exemplary data schema.

The data schema 128 comprises a schema that describes contents of the data 130. One embodiment of the data schema 128 is an XML schema, which may in one example comprise a file written in the XML Schema Definition Language (*.XSD file). FIG. 4 shows an illustrative excerpt of data schema 128, provided in graphical form by the XML Authority program. In this example, contents of the data 130 include many entries, each pertaining to a "product." Each product has a "base part number," "manufacturer," and certain "specs." The "specs" of a product include "body type," "supply voltages," and "output type." Further details of the representative product may also be utilized, as shown in FIG. 4.

The data schema 128 may comprise one schema or multiple schemas. For ease of description, this disclosure depicts the embodiment of the invention with one data schema. Nonetheless, multiple data schemas may be used, where different controls 120 relate to different data schema 128. In this embodiment, each completed query form annotation may only invoke controls related to the same data schema, in order to ensure a consistent completed query form page 107.

Platform—Query Form Controls

The query form controls 120 are the building components of the query form annotations, and provide a collection of basic input controls to characterize the querying of a complex product attribute. In other words, each query form control is responsible for contributing a part of the query, such as a range condition, ordering condition, select on condition, or equality condition. The query form controls therefore define subcomponents for constructing queries. Each query form control includes the following elements:

1. Mapping ("attachment") of the control to one or more specific elements or attributes of the data schema 128 to characterize how these elements should be queried. For example, a "text" control (permitting the user 104 to specify the sensor's maximum length) may be attached to the "length" element of the data schema 128.

2. Identification or coupling of the control to one or more corresponding appearance templates 124, which defines the way to interact and exchange data with the user 104. Such identification, for example, may be made by a filename, pointer, etc. The appearance template 124 corresponding to a control may implement a function such as one or more TEXT fields for the user to enter string and/or numeric values; RANGE fields for the user to choose numeric ranges; BOOLEAN fields; the determination of dependencies of this control to other controls; and predicates such equality and/or inequality.

3. Identification or other coupling of the control to one or more corresponding subquery generators 116 in order to implement the control's query logic ("functionality"). This aspect of the control thus selects one or more subquery generators 116 programmed to generate appropriate query instructions to implement the control's logic. Some exemplary query logic operations include SELECT, ORDER BY, RANGE, EQUALS, and the like.

Some or all of the foregoing components of a given control may be contained in one data object to form a more contiguous control, or these components may be externally located in different data objects as desired. In the illustrated embodiment, the query form controls are written in XML. TABLE 1A (below) shows an example of a SELECT query form control, providing an instance of a corresponding SELECT control schema 123b.

TABLE 1A

SELECT CONTROL (INSTANCE OF CONTROL SCHEMA)

```
<select ID=select1>
    <label>Manufacturer</label>
    <values>
        <value>
            <label>No preference</label>
            <value_data>any</value_data>
            <binding_path>.</binding_path>
        </value>
        <value>
            <label>Balluff</label>
            <value_data>Balluff</value_data>
            <binding_path>.</binding_path>
        </value>
        <value>
            <label>Baumer</label>
            <value_data>Baumer</value_data>
            <binding_path>.</binding_path>
        </value>
        <value>
            <label>Turck</label>
            <value_data>Turck</value_data>
            <binding_path>.</binding_path>
        </value>
    </values>
    <comparator>EQ</comparator>
    <categories>
        <category>Proximity Sensors</category>
        <category>General</category>
    </categories>
    <additional>false</additional>
    < info>(Annotation done 00/7/22)</info>
    <updateJSP>always</updateJSP>
</select>
```

The corresponding appearance template of TABLE 1A is illustrated by TABLE 3, depicted later in the present disclosure.

TABLE 1B (below) shows an example (instance) of a SORTBY query form control.

TABLE 1B

SORTBY CONTROL (INSTANCE OF CONTROL SCHEMA)

```
<sortby ID=sortby1>
    <path>.</path>
    <label>Manufacturer</label>
    <rank>3</rank>
</sortby>
```

Platform—Query Form Annotation

The data infrastructure also includes various query form annotations 122. Each query form annotation 122 prescribes the content of a web page for display to the user 104 in terms of which controls are used. In the illustrated embodiment, the order of appearance of controls in the query form annotation dictates the order of their on-screen presentation by completed query form pages 107. Query form pages 107 include a query-input portion where the user makes various choices to design his/her query, and a query-results portion where the user views results of the executed query and may optionally rearrange various aspects of the results such as arrangement, sorting, etc. Accordingly, each query form annotation identifies the desired controls to define the behavior of the query-input portion, and the desired data elements to define the content of the query-results portion. Optionally, annotations may be structured so as to implement dependencies of one control upon other controls. For example, the developer may specify that if the "selection menu" condition on the "shape" attribute of the data for "sensors" takes the value "cylindrical," then the query controls for "diameter" and "depth" should be activated, and if the menu condition takes the value "rectangular" then the "height," "width" and "depth" query controls should be activated. As another option, one or more results-oriented controls may be defined and these controls invoked by the query-results portions of the annotations to further customize presentation of query results. In the illustrated embodiment, the query form annotations are written in XML. TABLE 2 (below) shows an exemplary query form annotation.

ments, and other structure. These paradigms are provided by query form schema 123a (defining the query form annotations 122) and control schemas 123b (defining the controls 120). In the illustrated embodiment, there are multiple control schemas 123b, to provide cleaner more efficient modeling of different controls' operating requirements. Nonetheless, a single, more detailed master control schema may be used.

Figure 5:
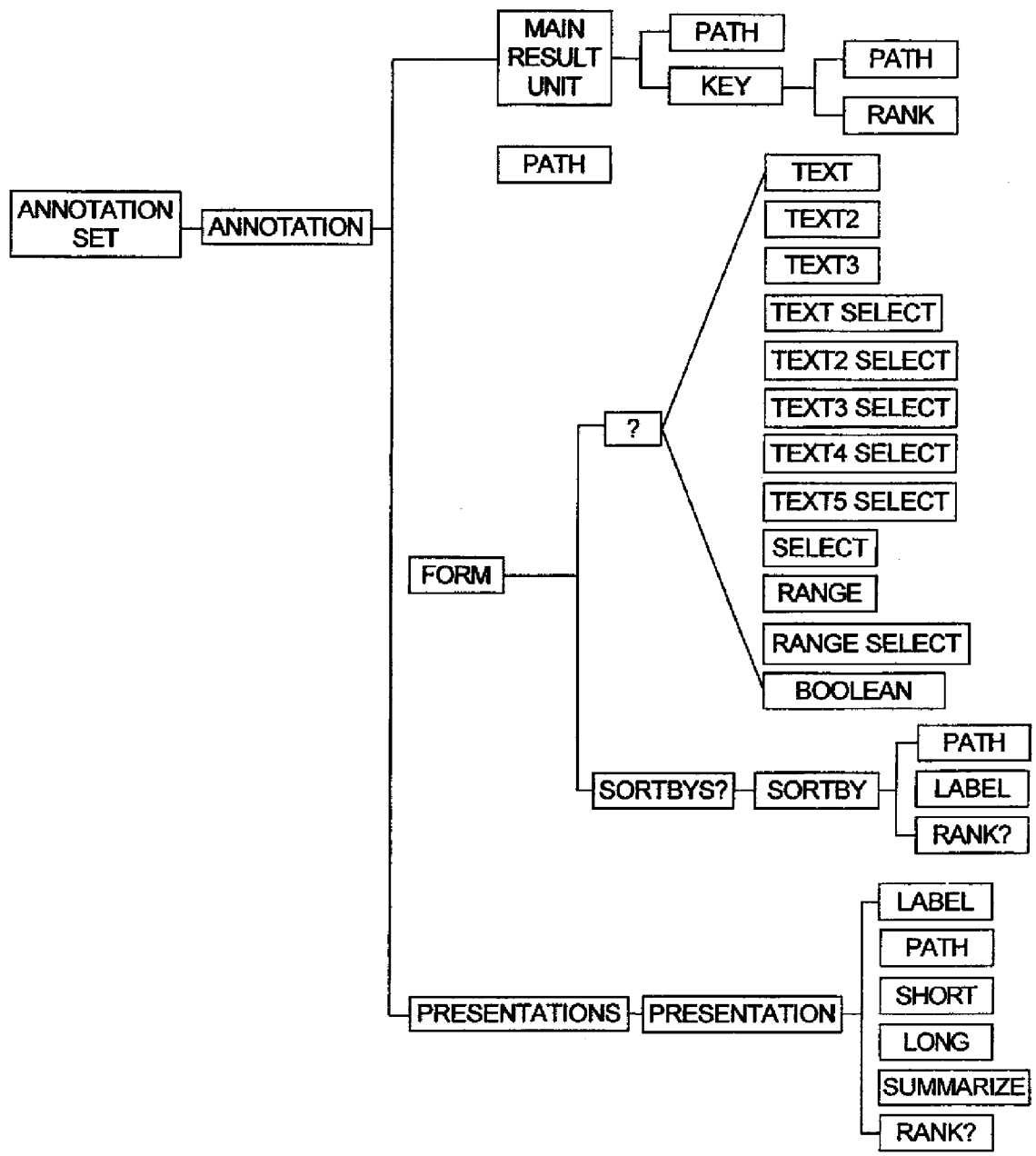
FIG. 5 is a diagram illustrating an exemplary query form schema.
Figure 6:
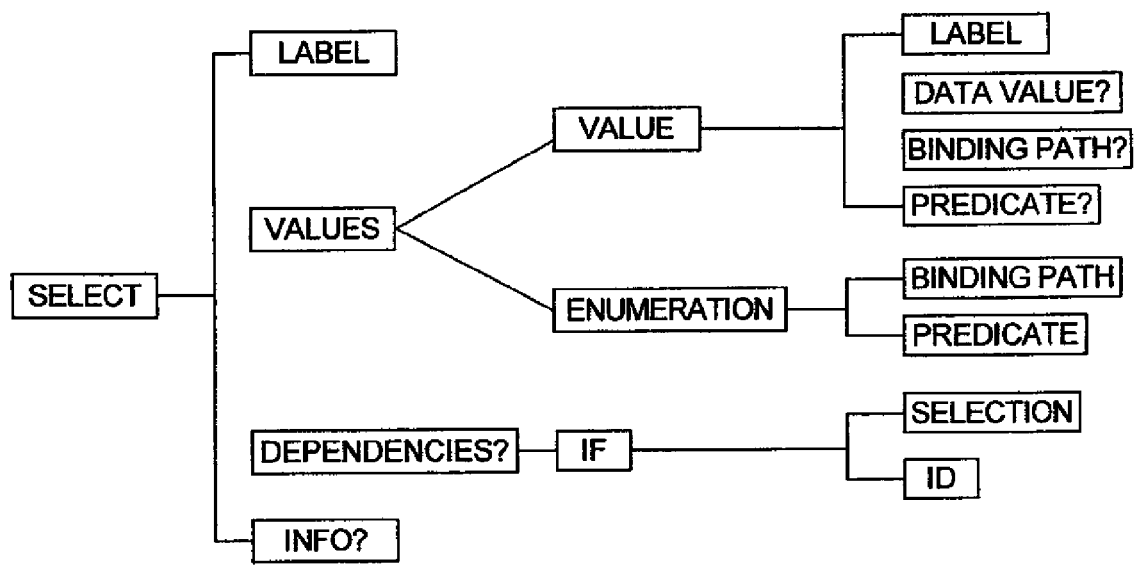
FIG. 6 is a diagram illustrating an exemplary control schema, embodied by a SELECT control.
Figure 7A:
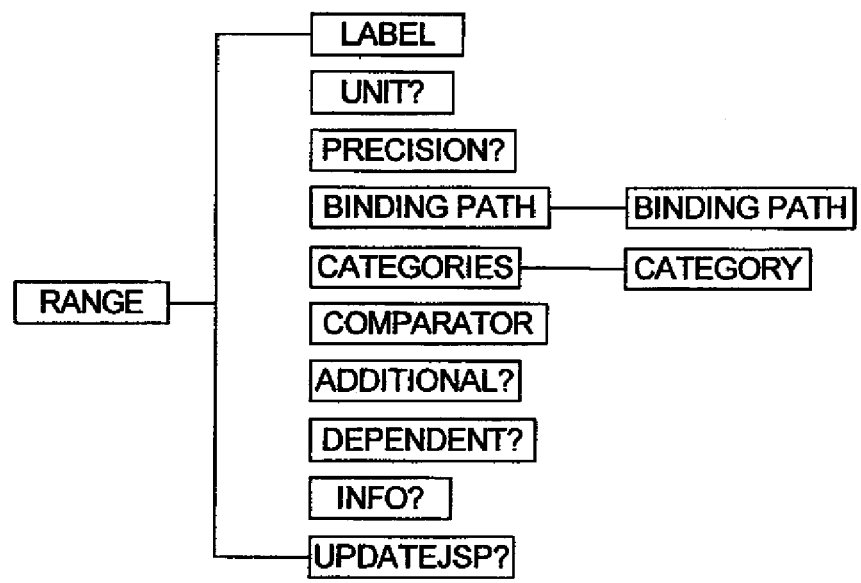
FIG. 7A is a diagram illustrating another exemplary control schema, embodied by a RANGE control.

In one embodiment, the schemas 123a-123b may comprise XML Schema Definition Language (*.XSD) files. FIG. 5 provides one embodiment of the query form schema 123a. FIG. 6 illustrates an exemplary query form control schema 123b for a control that implements a SELECT function. FIG. 7A illustrates a query form control schema pertaining to a different control, which implements a RANGE function.

Platform—Appearance Templates

Another part of the data infrastructure comprises the appearance templates 124. Each of the templates 124 corresponds to one of the controls 120, as mentioned above. Each of the templates 124 comprises a set of instructions executable by the web browser 104 to carry out the appearance and on-screen behavior of the corresponding control 120. Some examples of different behaviors include text entry boxes, pulldown menus, radio buttons, and the like. In the illustrated

TABLE 2

QUERY FORM ANNOTATION (INSTANCE OF QUERY FORM SCHEMA)

```
<?xml version="1.0"?>
<annotationSet>
    <annotation>
        <path >/proximity_sensors/product/manufacturer</path >
        <form>
            <select IDREF=select1>
            <sortbys>
                <sortby IDREF=sortby1 >
            </sortbys>
        </form >
        <presentations>
            <presentation IDREF=present1>
        </presentations>
    </annotation>
    <annotation>
        <path>/proximity_sensors/product</path>
        <main_result_unit>
            <path>/proximity_sensors/product</path>
            <key>
                <path>/proximity_sensors/product/base_part_number</path>
                <rank>1</rank>
            </key>
        </main_result_unit>
    </annotation>
</annotationSet>
```

As an alternative to the foregoing embodiment, the individual controls may be reduced or eliminated by incorporating them into more specialized query form annotations. Similarly, the control schemas may be incorporated into a number of query form schemas.

Platform—Control Schema, Query Form Schema

The controls 120 and annotations 122 are manifestations of respective paradigms that define their format, requisite eleexample, without any intended limitation, the templates 124 are provided in HTML to yield broad compatibility with web browsers. TABLE 3, below, provides an example of an appearance template corresponding to the SELECT control schema of FIG. 6. To provide a sufficiently detailed example, the appearance template of TABLE 3 utilizes HTML and JSP code, although other embodiments may be utilized such as C, Lisp, XSL, WML, etc.

TABLE 3

APPEARANCE TEMPLATE FOR SELECT CONTROL

```
<div style="display:<%= bean. getVisibility( ) %>" id=<%=
         bean.getTag_name( ).replace('_', 'U') %>>
         <table cellspacing=0 cellpadding=0 border=0 width=100%>
              <tr class="<% if ( bean.getAdditional( )) { %>additionalYes<%} else {
    %>additionalNo<% } %>">
                   <td class="queryText" valign=middle width=50%>
                        <% if (!bean.getInfo( ).equals(" ")) { %> <a href="#"
    onClick="showInfo('<%= bean.getInfo( ) %>');"> <% } %>
                        <b><%= bean.getLabel( ) %><% if ( bean.getUnit( ) != null) %> <%= " "+
    bean.getUnit( ) %> </b>
                        <% if ( !bean.getInfo( ).equals("")) {%> </a> <%} %>
                   </td>
                   <td valign=middle width=50% class="queryNsSelect">
                        <select id=<%= bean.getSelect_name( ) %> name=<%=
    bean.getSelect_name( ) %>
    <% if(bean.getMultiple( ).equals("yes")) { %> multiple <% } %> size=<%=
         bean.getSize( ) %>
         <if/> class="queryleSelect" value=<%= bean. getSelect_value( ) %>>
                            <% for (int i = 0; i < bean.getValues( ).size( ); i++) { %>
                            <OPTION value=<%= i %> <% if (bean. isSelected(i)) {
    %>SELECTED<% } %>><%= bean. getValues( ).get(i) %></OPTION>
                            <%}%>
                        </select>
                   </td>
              </tr>
         </table>
</div>
```

Figure 7B:
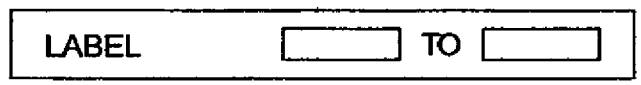
FIG. 7B is a diagram illustrating an appearance template representing the RANGE control.
Figure 7C:
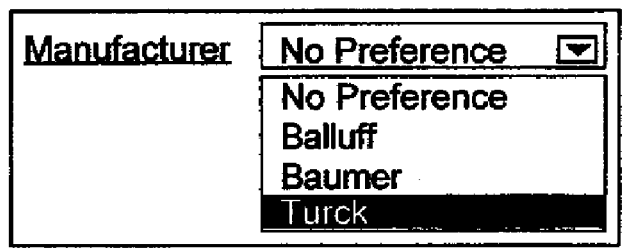
FIG. 7C is a diagram illustrating an appearance template representing a SELECT control.

FIG. 7C shows the appearance of a SELECT control exemplified by TABLE 3, as presented by an HTML browser. TABLE 4, below, provides an example of an appearance template corresponding to the RANGE control schema of FIG. 7A.

TABLE 4

APPEARANCE TEMPLATE FOR RANGE CONTROL

```
<div style="display:<%= bean.getVisibility(browser) %>" id=<%=
bean.getTag_name( ).replace('_', 'U') %>>
         <table cellspacing=0 cellpadding=0 border=0 width=100%>
              <tr class="<% if ( bean.getAdditional( )) { %>additionalYes<% } else {
%>additionalNo<% } %>">
              <td valign=middle width=50% class="queryText">
              <% if (!bean.getInfo( ).equals("")) { %> <a href="#"
onClick="showInfoVarDims('<%= bean.getInfo( ) %>',250,70);"> <% } %>
              <b><%= bean.getLabel( ) %><% if ( bean.getUnit( ) != null ) %> <%= " " +
bean.getUnit( ) %></b>
              <% if ( !bean.getInfo( ).equals("")) {%> </a><%} %>
              </td>
              <td align="left" class="queryNsInput" width=20%>
              <input name=<%= bean. getTextfield1_name( ) %> size=3 class="queryleInput"
value=<%= bean.getTextfield1_value( ) %>>
              </td>
              <td align="center" class="queryText" width= 10%><b>to</b></td>
              <td align="right" class="queryNsInput" width=20%>
              <input name=<%= bean. getTextfield2_name( ) %> size=3 class="queryleInput"
value=<%= bean. getTextfield2_value( ) %>>
              </td>
         </tr>
    </table>
</div>
```

FIG. 7B shows the appearance of the RANGE control exemplified by TABLE 4, as presented by an HTML browser.

Platform—Subquery Generators

Still another aspect of the data infrastructure comprises the subquery generators 116. Each of the subquery generators 116 corresponds to one of the controls 120, and comprises computer-executable programming to generate query instructions implementing the corresponding control's functionality. As an example, each subquery generator 116 may comprise a JavaBean that is programming to create query statements implementing the corresponding control 120. In the presently illustrated example, where the data 130 is populated with instances of the XML data schema 128, the subquery generators 116 may be programmed to generate query statements in XML Query Language. Appendix A, further below, provides an exemplary subquery generator for the SELECT control of TABLE 1A.

Platform—Compiler

The compiler 104 comprises a software module configured to represent the query form annotations 122 in web-browser-compatible format, among other functions. In the presently illustrated example, the compiler 104 constructs an HTML representation of each query form annotation 122 according to the appearance templates 124 required by the controls 120 invoked by that query form annotation 122. The compiler 104 provides an output of its compiled HTML instructions to a buffer 107 of completed query form pages. The buffer 107 comprises a facility for storing completed query form pages that have been prepared by the compiler 104. The buffer 107 may comprise a hardware device, software buffer, or other suitable repository.

In addition to the above-mentioned function, the compiler 104 also produces data and code to properly initialize the appropriate subquery generators 116 and query assembler 112. Such initialization involves passing variables, parameters, and accompanying interpretive instructions to the units 116, 112. The compiler 104 outputs its initialization code to an initialization code buffer 113, for the purpose of making such code accessible for later use by the assembler 112 as discussed below.

The compiler 104 is coupled to the controls 120 and annotations 122 since these components dictate the logical and presentation aspects of the query form page 107 being constructed by the compiler. The compiler 104 is coupled to the appearance templates 124 since these constitute the source of the presentation code for making completed query form pages 107. The compiler 104 is coupled to the data schema 128 to enable the compiler to properly initialize the query assembler 112 to create queries against the correct data elements as identified by the relevant query form controls.

Platform—Run-Time Engine

The run-time engine 108 constructs query statements against the data 130 in accordance with the user's completion of query form pages 107 presented by the web server 106. The run-time engine 108 also supervises the execution of these query statements, and presents the results back to the web browser 104.

The run-time engine 108 includes a query assembler 112 and a rendering engine 110. The query assembler 112 activates the appropriate subquery generators 116 to prepare query statements implementing the user's query. In the presently illustrated example, the subquery generator's query statements are constructed in the XCQL language. The query assembler 112 directs the data server 114 to carry out the XCQL query statements upon the data 130.

The rendering engine 110 receives results of query execution from the data server 114, and reformulates the results for presentation to the web browser 104. More particularly, the rendering engine 110 acts according to rendering instructions from the query assembler 112, and provides an output of HTML or other presentation code compatible with the user's web browser 104 in accordance with XML query results from the data server 114. Alternatively, instead of custom rendering instructions from the assembler 112, the rendering engine 110 may act according to a default set of universal rendering instructions. In still another embodiment, the rendering engine 110 may be omitted, with the rendering task delegated to the server 106 or web browser 104.

Exemplary Digital Data Processing Apparatus

As mentioned above, the platform 102 may be implemented in various forms. As one example, the platform 102 may comprise a digital data processing apparatus, as exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the platform 102. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the operational aspect of the present invention will now be described. As mentioned above, this aspect generally involves configuring and operating a flexible format, web-browser compatible data query system. Although the present invention has broad applicability to various representations of data and query languages, the specifics of the structure that has been described exemplifies an XML platform, and the explanation that follows will emphasize such an application of the invention without any intended limitation.

Storage Media

Figure 2:
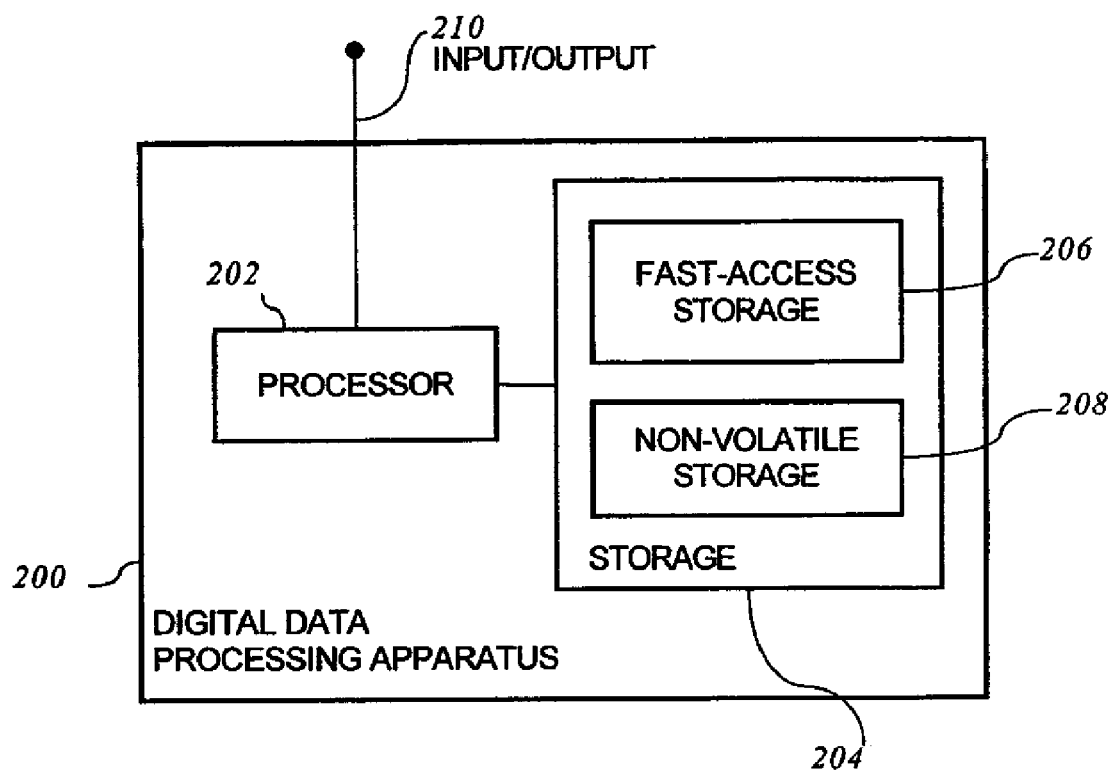
FIG. 2 is a block diagram of a digital data processing machine.

In the context of FIGS. 1-2, such a method may be implemented, for example, by operating the platform 102, as embodied by one or more digital data processing apparatuses 200, to execute respective sequences of machine-readable instructions. These instructions may reside in various types of storage media. In this respect, one aspect of the present invention concerns storage media embodying a program of machine-readable instructions executable by a digital data processor to configure and operate a reconfigurable, web-browser compatible data query system.

Figure 3:
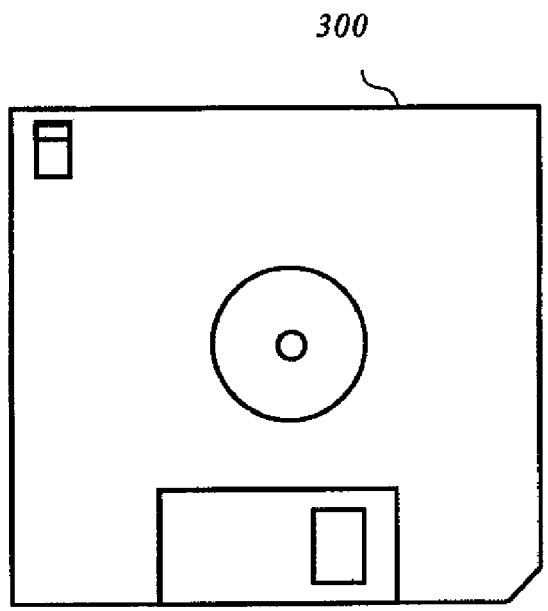
FIG. 3 shows an exemplary storage medium.

This storage media may comprise, for example, RAM (not shown) as represented by the storage 206. Alternatively, the instructions may be contained in another storage media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media. Some examples include as direct access storage (e.g., a conventional "hard drive," redundant array of inexpensive disks ("RAID"), or another direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), etc.

Logic Circuitry

In contrast to the storage medium discussed above, the method aspect of the invention may be implemented using logic circuitry, without using a processor to execute instructions. In this embodiment, the logic circuitry is used to implement the platform 102, and is configured to perform operations to implement the method of the invention. The logic circuitry may be implemented using many different types of circuitry, as discussed above.

Overview

Figure 8:
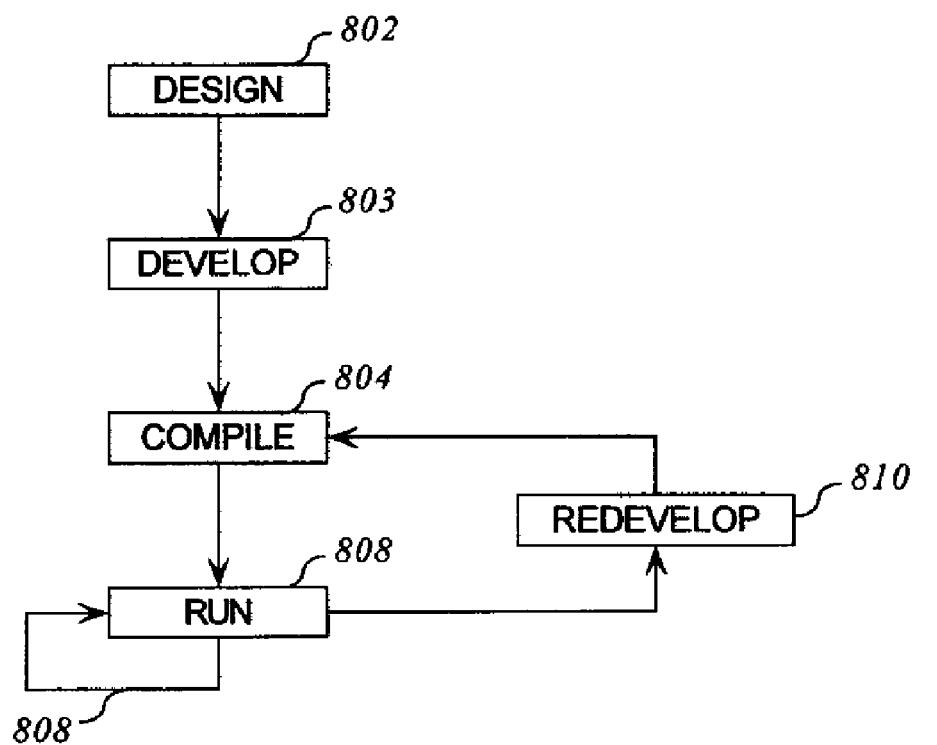
FIG. 8 is a flowchart showing the overall operating sequence of the invention.

FIG. 8 shows a sequence 800 illustrating an overview of the invention's operation. For ease of explanation, but without any intended limitation, description of FIG. 8 (and the following FIGS. 9A-12) is made in the context of the environment 100 (FIG. 1) as discussed above. The sequence 800 begins in step 802, where programmers design the platform 102. Namely, programmers construct the data schema 128, control schemas 123b, query form schema 123a, and subquery generators 116. As a particular advantage of this invention, the creation of the foregoing components need only be a one-time operation (unless further modification is for some reason desired). As one example, step 802 may be performed by a software manufacturer that intends to sell the platform 102 for subsequent on-site configuration and use. The designers may also include one or more controls, for example, to serve as a starter library.

Next, in step 803, developers utilize the platform 102 to develop their intended application. In the present example, step 803 is performed by development personnel seeking to configure the platform 102 for their particular data, query needs, user interface, etc. Accordingly, in step 803 developers construct a different query form annotation 122 for each different query form page (web page) that is desired, and also instantiate controls 120 as required by the annotations 122. The process of developing controls 120 and query form annotations 122 may be referred to as "instantiating" the query form schema 123a.

More particularly, when developing a query form annotation, the developer plans a query input portion and a query results portion. Planning the query input portion involves specification of data elements in the data schema 128 that will be involved in performing the query of that form and also which of the controls 120 is going to be used for each data element. This may be referred to as conducting a mapping between controls and elements of the data schema 128. In developing a query results portion, the developer specifies the data elements that will be presented on the query result frame. Optionally, if the control schemas 1236 include one or more results-oriented-controls, the developer may instantiate results-oriented-controls as desired and include such controls in the query form annotation to specify a more complex query results portion.

The produced annotations are saved in the query form annotations 122, which comprises XML annotation files. The foregoing approach offers the advantage that query web pages may be quickly added or amended by changing the query form annotations 122, and if any new controls are needed, the query form controls 120.

After step 803, a compile operation is performed in step 804. At this time, an operator directs the compiler 104 to compile the query form annotations 122. In this process, the compiler 104 uses the query form annotations as guides to collect the appropriate appearance templates 124 according to the elements, values, and references specified by the applicable controls 120, and combines the appearance templates 124 as specified by the order that the controls appear in the annotations 122 (as one example). The result of this operation is a series of HTML code for each annotation 122, executable by the web browser 104 to visually present a corresponding query form as planned in step 803. The compiler 104 stores the completed HTML code in the completed query form buffer 107.

Depending upon the particular implementation of the invention, the compiler 104 may also act in step 804 to initialize all subquery generators 116 corresponding to controls 120 that are invoked by the query form annotations being compiled, and also to initialize the query assembler 112. These operations are discussed in greater detail below. Step 804 may be performed, for example, by the same development personnel that perform step 803, above.

After step 804, there is a run operation 808, described as follows. In the course of operating his/her web browser 104 to view various web pages, the user requests a particular completed query form page, prepared according to this invention. In response, the web server 106 retrieves the HTML code representing the completed query form from the buffer 107, and directs this code to the web browser 104. The web browser 104 presents the completed query form page upon the user's display, whereupon the user operates the web browser 104 to complete the query form page with various query parameters, and submit the requested query parameters to the web server 106. The web server 106 forwards the user's query parameters to the run-time engine 108, which constructs a query based upon the user's specifications. The run-time engine 108 directs the data server 114 to carry out the constructed query upon the data 130. The data server 114 returns results to the run-time engine 108, which renders the results to the web browser 104 by preparing HTML or other suitable presentation code and transmitting the code to the server 106. Step 808 may be repeated many times, as the user directs the web browser 104 to load other query form pages or to repeat the interaction with the same ones but with different query parameters.

Optionally, if the developers wish to prepare new query form pages or change existing ones, they may institute step 810. To change an existing web page, developers need only amend the query form annotation 122. For example, the query form annotation 122 may be amended to utilize different controls. To add a new query form page, a representative annotation is constructed and stored in 122. Optionally, the developers may add new controls 120 in step 810. After step 810, the compile operation 804 is repeated to re-compile the amended (or newly added) query form page. The run step 808 then occurs as discussed above.

Design Phase

FIG. 9A shows a sequence 950 illustrating the design step 802 of FIG. 8 in greater detail. In step 954, designers prepare the query form schema 123a. The query form schema 123a comprises a paradigm that defines the format, requisite elements, and other structure of the query form annotations 122.

In one embodiment, the schema 123a may comprise an XML Schema Definition Language (*.XSD) file.

After step 954, designers create a number of control schemas 123b (step 956). Analogous to the query form schema 123a, each control schema 123b comprises a paradigm that defines the format, requisite elements, and other structure necessary for controls 120 to constitute instances of such control schemas 123b. As an example, one control schema 123b may define RANGE controls (as exemplified by FIG. 7A), another defining SELECT controls (as exemplified by FIG. 6), etc. In one embodiment, each schema 123b may comprise an XML Schema Definition Language (*.XSD) file.

In step 958, designers obtain or prepare the appearance templates. This involves writing presentation code corresponding to the desired control appearance and user interaction. In step 960, designers construct the subquery generators 116. This involves preparing code to generate query instructions that are executable to implement desired query logic.

As a particular advantage of this invention, the foregoing design steps may be a one-time operation. As explained below, new or changed query web pages may be quickly developed at a later time by creating new query form pages or amending existing ones, leaving the schemas 128, 123a, 123b and subquery generators 116 intact.

Develop Phase

Figure 9B:
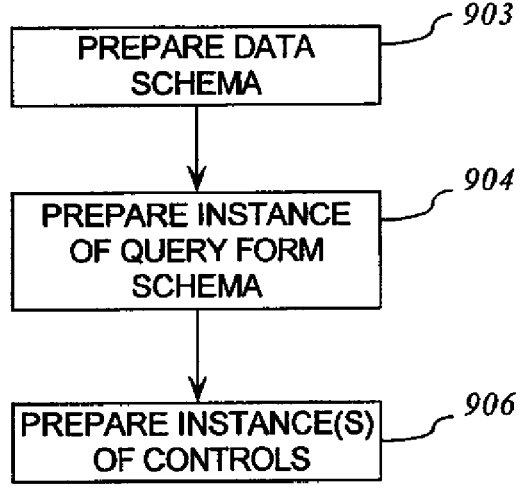
FIG. 9B is a flowchart showing a develop process.

FIG. 9B shows a sequence 900 illustrating the develop phase 803 of FIG. 8 in greater detail. In step 903, designers create the data schema 128. As mentioned above, the data schema 128 comprises an XML schema that describes contents of the data 130 to be queried. One embodiment of the data schema 128 is an XML Schema Definition Language (*.XSD) file. Optionally, the data schema 128 may be preassembled, in which case step 903 may be skipped. In step 904, developers instantiate the query form schema 123a. More particularly, developers prepare a different query form annotation 122 for each web page to be presented to the user 104. This step requires the developer to plan a query input portion and a query results portion. Planning the query input portion involves specifying the desired controls to be used by the query form annotation under construction. In developing the query results portion, the developer identifies the data elements that will be presented on the query result portion.

In step 906, the developers prepare the controls 120 necessary to the query form annotations of step 904. Each control 120 constitutes an instance of one of the control schemas 123b, and defines (1) mapping to one or more specific elements or attributes of the data schema 128, (2) identification of one or more appearance templates, and (3) identification of one or more corresponding subquery generators. One control, for instance, may define the measurement units and data to be shown in a RANGE box such as FIG. 7B. Another control may define how the SELECT function (defined by the SELECT schema of FIG. 6) is applied to data to yield a desired query.

The process of developing controls 120 (step 906) and query form annotations 122 (step 902) may be referred to as "instantiating" the query form schema. In the illustrated example, steps 904-906 produce respective data objects in *.XML format.

Compile-Time Phase

Figure 10:
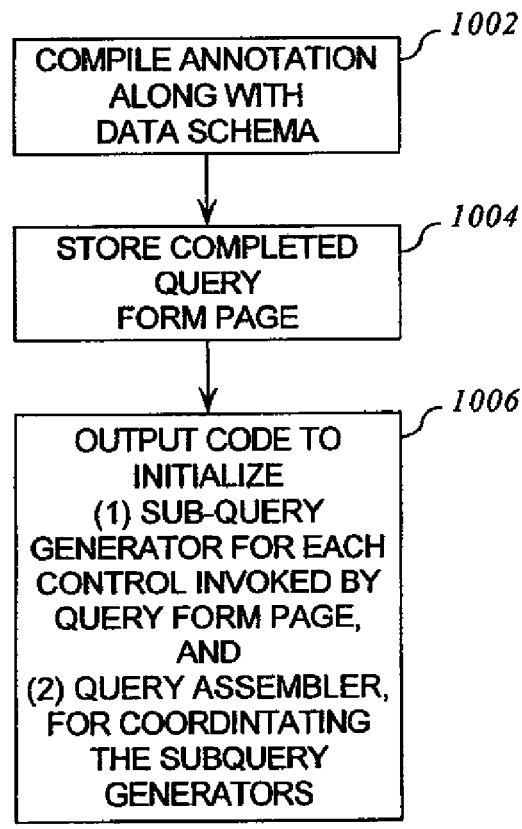
FIG. 10 is a flowchart showing a compile process.

FIG. 10 shows a sequence 1000 illustrating the compile phase 804 of FIG. 8 in greater detail. The sequence 1000 may be repeated for each query form annotation (as in the presently illustrated example), the query form annotation under compilation being referred to as the "current" query form annotation. In a different embodiment (not shown), all query form annotations may be processed in parallel. In the illustrated example, developers first direct the compiler 104 to compile the current query form annotation 122 with the data schema 128 (step 1002). In this step, the compiler 104 retrieves all appearance templates 124 identified by controls included in the current query form annotation 122, and according to the annotation assembles the retrieved appearance templates 124 into an HTML listing that presents a representative web page 107. In other words, this step utilizes the compiler 104 to generate computer-readable instructions for visually presenting the current query form annotation (one instance of the query form schema 123a). After step 1002, the compiler stores the results of step 1002 in the completed query form buffer 107 (step 1004).

Next, according to the annotation being compiled, the compiler 104 produces appropriate initialization code for the query assembler 112 and the subquery generators 116 (step 1006). The compiler 104 stores its output of initialization code in the buffer 113, to make it available for future access by the query assembler 112. As for initialization of the subquery generators 116, preparation of the initialization code involves setting the necessary properties of these generators 116, including values for selection conditions, units, comparison predicates, and the like. Different initialization code is prepared for each query form control 120. As for the initialization of the query assembler 112, preparation of the initialization code involves. identifying the generators 116 invoked by the current query form annotation to the query assembler 112.

As discussed in greater detail in explaining the run process (FIG. 11, below), the initialization code for the query assembler 112 and subquery generators 116 is used by the run-time engine 108 when the user 104 requests the completed query form page 107 corresponding to the query form annotation for which the initialization code was prepared. Step 1006 completes the sequence 1000.

The following examples illustrate the initialization code for a subquery generator 116 (TABLE 5) and for the query assembler 112 (TABLE 6), both corresponding to the SELECT function.

TABLE 5

INITIALIZATION CODE FOR "SELECT" SUBQUERY GENERATOR

```
<jsp:useBean id="formname_manufacturer" scope="session"
    class="com.enosysmarkets.xqforms.controls. SelectControl Bean" />
<jsp:setProperty name="formname_manufacturer" property="control name" value="select"
    />
<jsp:setProperty name="formname_manufacturer" property="tag_name"
    value="manufacturer" />
<jsp:setProperty name="formname_manufacturer" property="label"
    value="\"Manufacturer\"" />
```

TABLE 5-continued

INITIALIZATION CODE FOR "SELECT" SUBQUERY GENERATOR

```
<jsp:setProperty name="formname_manufacturer" property="values_labels" value="No
    preference, Balluff,Baumer,Turck" />
<jsp:setProperty name="formname_manufacturer" property="binding_paths"
    value=" proximity sensors. product. manufacturer" />
<jsp:setProperty name="form name_manufacturer" property="values_data"
    value="any,Balluff,Baumer,Turck"/>
<jsp:setPropertyname="formname_manufacturer" property="values_datatype"
        value="string, string, string, string" />
<jsp:setProperty name="formname_manufacturer" property=" category" value="Proximity
    Sensors, General" />
<jsp:setProperty name="formname_manufacturer" property="visibility" value="" />
<jsp:setProperty name="formname_manufacturer" property="comparator" value="EQ" />
<jsp:setProperty name="formname_manufacturer" property="additional" value="false" />
<jsp:setProperty name="formname_manufacturer" property="updatejsp" value="always" />
<jsp:setProperty name="formname_manufacturer" property="info" value="\"(Annotation
    done 00/7/22)\" " />
```

TABLE 6

INITIALIZATION CODE FOR QUERY ASSEMBLER 112

```
<jsp:useBean id="example" scope="session"
class="com.enosysmarkets.xqforms.HierarchyBean" />
<jsp:setProperty name="example" property="file_name" value="example" />
    <jsp:setProperty name="example" property="source" value="proxDemo" />
        <% example.setFields( ); %>
<% example.addControl(example_manufacturer); %>
...
<% example. setOrderbyElements(example_orderby); %>
        <% example.setPresentationElements(example_presentation); %>
        <% example.setSummarizationElements(example_summarization); %>
```

Run-Time

Figure 11:
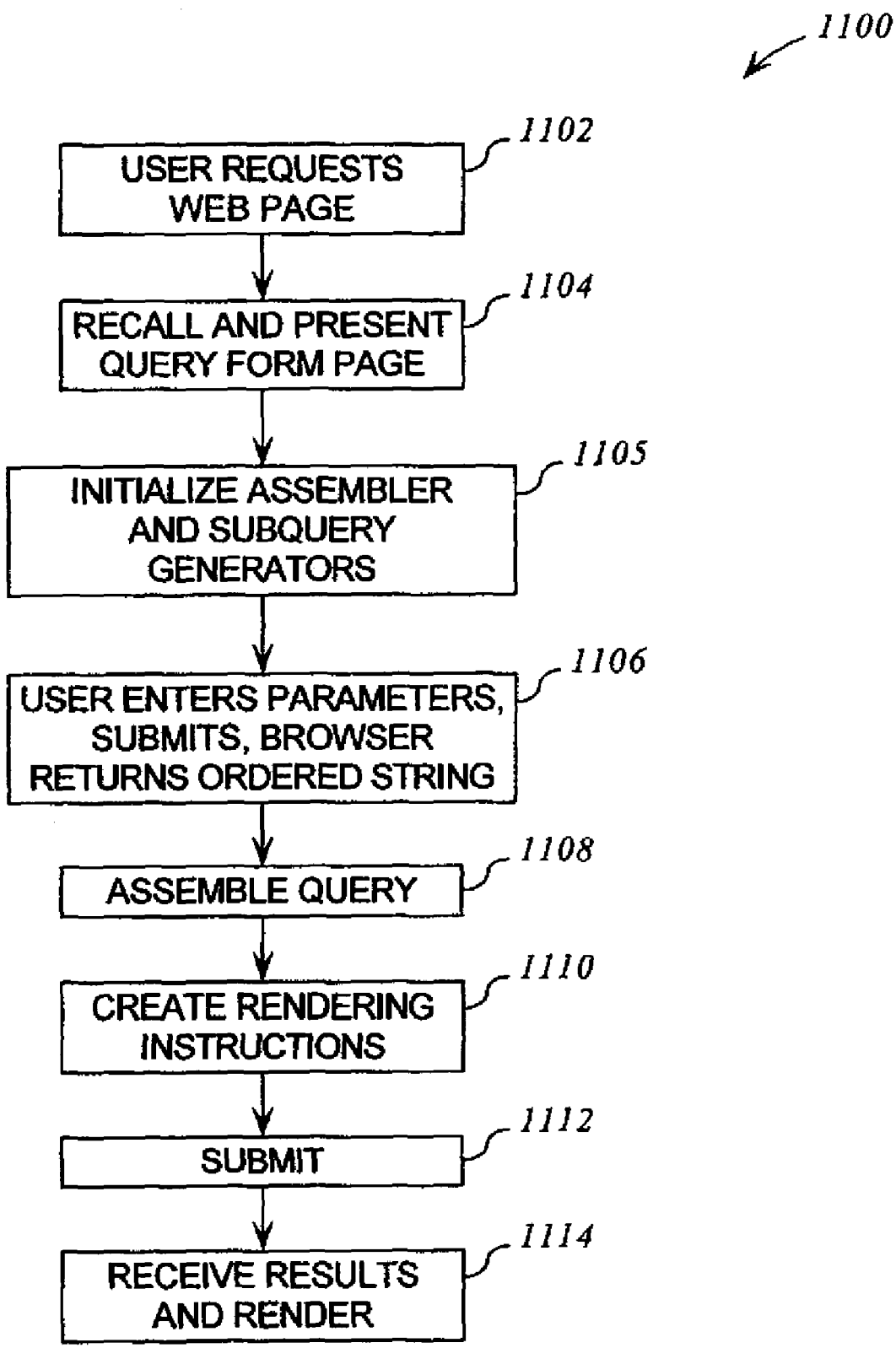
FIG. 11 is a flowchart showing a run-time process.

FIG. 11 shows a sequence 1100 illustrating the run step 808 of FIG. 8 in greater detail. Basically, the sequence 1100 recalls a completed query form page and generates an on-screen presentation to the user 104, prepares and executes query instructions appropriate to the user's completion of the on-screen query form, and renders the results back to the user 104. The sequence 1100 is described in the context of a "current" completed query form page, although it is understood that the sequence 1100 may be repeated numerous times for various completed query form pages in the buffer 107.

Figure 12:
FIG. 12 is a diagram illustrating the presentation of an exemplary query form page.

The sequence 1100 begins in step 1102, where the web browser 104 requests downloading of a completed query form from the web server 106. In response, the web server 106 recalls the appropriate one of the completed query forms 107 and directs this page to the web browser 104 (step 1104). The web browser 104 creates an on-screen presentation of the query form page for the user 104. FIG. 12 provides an exemplary on-screen presentation 1200 of a query form page including a query-input portion 1202 and a query-results portion 1204, as discussed in greater detail below.

Also responsive to the user's request 1102 to download a completed query form page 107, the web server 106 notifies the run-time engine 108 of the user's request, whereupon the run-time engine 108 initializes the query assembler 112 and subquery generators 116 (step 1105). Initialization involves setting the properties of the assembler 112 and generators 116 according to the initialization code 113 that corresponds to the query form annotation defining the current query form page 107. Thus, step 1105 involves the assembler 112 consulting and implementing the appropriate initialization code 113 as needed. Step 1105 may be performed before, during, or after step 1104. In the case of the assembler 112, the initialization step 1105 may be achieved by identifying the applicable subquery generators that were initialized when the query form annotation representing the current query form page was compiled. In the case of the subquery generators 116, the initialization of step 1105 may be achieved by executing the initialization code prepared during compilation of the query form annotation representing the current query form page, thereby providing the subquery generator with the data elements, mapping, and other properties necessary to execute the required query when the user's query parameters arrive (as discussed below in step 11106).

In step 1106, the user fills-out the on-screen form 1200 by entering various input data. In the presently illustrated example, the user submits his/her query by selecting an "execute" button 1206, whereupon browser 104 collects query parameters representing the query represented by the user's completion of the on-screen query form page, and submits these parameters to the platform 102. In step 1108, the query assembler 112 receives the query parameters, and assembles query instructions appropriate to carry out the query defined by these query parameters. More particularly, the assembler 112 and generators 116 translate the user's submitted query parameters into conditions against the data elements according to the data schema 128, and the assembler 112 includes these conditions in a query for subsequent transmission to the data server 114 and execution on the data 130. This query only requests an output of those data elements appearing in the query results portion of the relevant annotation, in compliance with the initialization code 113 for the assembler 112.

In the presently illustrated example, the query assembler 112 invokes the appropriate subquery generators 116 (as specified by the initialization code 113) to generate sub-query instructions in the XCQL query language. The assembler 112 constructs a skeletal XCQL query and then coordinates the subquery generators 116 to fill out the query. The assembler 112 also assembles these query instructions into a complete query instruction.

After step 1108, the query assembler 112 creates rendering instructions for use by the rendering engine 110 (step 1110). In particular, the query assembler 112 creates rendering instructions directing the rendering engine 110 to transform the query results data (to be returned by the data server 114) into HTML or other presentation code appropriate and convenient for display on the web browser 104. The rendering instructions can be expressed in a transformation language, for example XSL. Step 1110 is optional, however, because the rendering engine 110 may instead use a default set of rendering instructions, which are independent of the particular query generated by the assembler 112. The default set of rendering instructions may be dependent or independent upon the data schema 128, depending on the desired implementation.

After step 1110 (or step 1108 if step 1110 is omitted), the query assembler 112 submits the assembled query instruction to the data server 114 (step 1112); at this time, the assembler 112 may also submit rendering instructions to the rendering engine 110. In response, the data server 114 executes the requested query upon the data 130, and returns the results to the run-time engine 108.

In step 1114, the data server 114 returns the query results, which reside in XML form in this example. The run-time engine 108 receives these results, and more particularly, the rendering engine 110 processes the query results by rendering them to the web browser 104. In the illustrated example, rendering occurs by the rendering engine 110 invoking the XSL script, which was prepared as discussed above. The XSL script renders the XML query results into appropriate presentation code for the browser 104, which in this example is HTML. If the user changes the on-screen parameters and re-submits the query form page, steps 1106-1114 are repeated.

On-Screen Presentation

FIG. 12 provides an exemplary on-screen presentation 1200 of a completed query form page. The presentation 1200 includes a query-input portion 1202 and a query-results portion 1204.

The query-input portion 1202 is produced during the compile-time process (shown in FIG. 10), and specifically in step 1002, and is retrieved in step 1104 of the run-time process (shown in FIG. 11) from the buffer 107 of completed query form pages. This portion includes the instantiated appearance templates of the query form controls as the HTML browser renders them, such as the one shown in FIG. 7C. The query form controls are organized in categories (General, Mechanical, etc.) according to their instances prepared during step 906 of the develop process (shown in FIG. 9B). These controls are mapped to data elements, in this case, to the XML data schema of products entitled "Proximity Sensors" shown in FIG. 4. In the lower left corner of the portion 1202, the instantiated appearance template of the special query form control SORTBY is shown, which is produced from annotations such as the one in TABLE 1B, and determines the sort-by list and the type of sorting (ascending, descending) for the results. At the same place, another special query form control CONTINUATION determines the number of results that will be displayed in the query-results portion 1204.

In step 1106 of the run-time process, the user interacts with the query-input portion 1202 from her station 104 to select desirable characteristics of the product being sought, such as manufacturer, body type, dimensions, and the like, and then submit the query form using the execute button 1206. In step 1108 of the run-time process a query is formulated from the query assembler 112 and the subquery generators 116, using the submitted query-input portion 1202, and it is executed against the data server 114.

In order to present the results returned from the data server 114 in the query-results portion 1204, rendering instructions are created from the rendering engine 110 in step 1110 of the run-time process, as described in more detail the run time description (hereinabove). These instructions are generated based on the query form annotations 122, such as the one in TABLE 2. These instructions produce one line in the query-results portion 1204 for each main entity returned, which in this case is the PRODUCT element of the "Proximity Sensors" data schema in FIG. 4. For each main entity a set of attributes specified in the query form annotation 122 are presented. Each attribute corresponds to a column of the table used to present the results. The main entities with identical values for the elements in the sort-by list of the query form are displayed grouped in the query result, like the Manufacturer and Output Type columns.

Finally, the rendering engine 110 renders the summarization/filtering lists that appear under the headers of the table. The attributes for which these lists are generated can be specified in the query form annotation 122. These lists show the possible values for each column for the specific main entity's attribute and by selecting one of these values, the results are restricted to this particular value.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

---

COPYRIGHT© 2001 ENOSYS MARKETS, INC. ALL RIGHTS RESERVED

```
public void add Paths(XMAS Element element) {
    Vector pathElms = new Vector( );
    Vector inputElms = new Vector( );
    Integer choice;
    String fullpath = new String(path);
```

-continued

| COPYRIGHT© 2001 ENOSYS MARKETS, INC. ALL RIGHTS RESERVED |
|---|

```
  String pass = new String( );
if (!select.equals("")) {
  // convert select String to Vector
  input2vector(select, inputElms);
  for (int i = 0; i < inputElms.size( ); i++) {
    choice = new Integer((String)inputElms.get(i));
      if (values_data.size( )== 0) {
        // we incorporate EXISTS condition only here because it's not possible
        // for an option to bind to an internal node and have a value data
        if ( ((String)values.get(choice. intValue( ))).equals("any") II
((String)values_paths.get(choice. intValue( ))).equals("any") )
          return;
        else {
          if (!((String)condition.get(0)).equals("EX")) {
            if ( ((String)values_type.get(choice.intValue( ))).equals("string") )
              pass += "\"" + (String)values.get(choice.intValue( )) + "\",";
            else
              pass += (String)values.get(choice.intValue( )) + ",";
          } else {
            fullpath = path + "." + (String)values_paths.get(choice.intValue( ));
            path2vector(fullpath, pathElms);
            element. checkInsertPath(path Elms, (String)values.get(choice.intValue( )),
(String)condition.get(0));
          }
        }
      } else {
        if ( ((String)values_data.get(choice.intValue( ))).equals("any") )
          return;
        else {
          if ( ((String)values_type.get(choice. intValue( ))).equals("string") )
            pass += "\"" + (String)values_data.get(choice.intValue ( )) + "\",";
          else
            pass += (String)values_data.get(choice.intValue( )) + ",";
        }
      }
  }
        if ( ((String)condition.get(0)).equals("EX"))
        return;
        pass = pass.substring(0, pass.length( ) – 1);
        fullpath = path;
        // take the value_path of the first choice, all of them must be equal
        choice = new Integer((String)inputElms.get(0));
        if ( !((String)values_paths.get(choice.intValue( ))).equals(".") )
        // add the value path
        fullpath = fullpath + "." + (String)values_paths.get(choice.int Value( ));
        // convert path String to Vector
        path2vector(fullpath, pathElms);
        // get the type and value and generate the subquery
        element.checkInsertPath(pathElms, pass, (String)condition.get(0));
     }
   }
```

What is claimed is:

1. A system enabling the querying of data modeled by an XML schema, comprising: a processor;

A non-transitory computer readable media coupled to the processor, the computer readable media comprising:

at least one XML data schema describing contents of data to be queried, wherein the XML data schema is used to generate a query form user interface, wherein the query form user interface comprises an input portion and an output portion;

at least one generator programmed to generate query statements in XML Query Language in response to user input in the query input user interface; and a query assembler, wherein the query assembler invokes the generator to assemble and submit query requests received at the input portion to multiple different databases at least some of which are not homogeneous for the execution of the specified query upon a collection of data and wherein the collection of data is populated with instances of the at least one XML data schema, and wherein a response to the query requests is displayed on the output portion;

wherein the input portion of the query form comprises query form controls that are mapped to the XML data schema;

wherein a first query form control comprises an instance of a control schema defined by an XML Schema Definition Language file and maps to a specific element of the XML data schema and identifies one or more subquery generators.

2. The system of claim 1, wherein the XML data schema may comprise one schema or multiple schema.

3. The system of claim 1, wherein the collection of data is stored in an XML format.

4. The system of claim 1, further comprising a run-time engine that includes the query assembler and a rendering engine.

5. The system of claim 4, wherein the rendering engine receives query results and transforms the query results using a transformation language.

6. The system of claim 5, wherein the rendering engine transforms the query results using XSL.

7. The system of claim 1, further comprising query form pages to receive query parameters from users, wherein the query form pages are generated from query form annotations and templates.

8. The system of claim 7, wherein the query form annotations include:
   a query input component, wherein the query input component comprises a selection of multiple controls and their relation to the data schema; and
   a query results component, wherein the query results component comprises a selection of the elements of the data schema to be presented in the results of the query.

9. The system of claim 7, wherein the templates contain presentation logic for displaying the query form pages in a web browser.

10. A computer implemented method to query data modeled by an XML schema, comprising the following steps:
   using at least one XML data schema describing contents of data to be queried, wherein a collection of data from multiple different databases that are not homogeneous is populated with instances of the at least one XML data schema, wherein the XML data schema is used to generate a query form user interface, wherein the query form user interface comprises an input portion and an output portion;
   generating query statements in XML Query Language through the use of at least one generator in response to user interaction with the input portion; and
   invoking from a query assembler to the generator to assemble and submit query requests received at the input portion to the multiple different databases for the execution of the specified query upon the collection of data, wherein a response to the query requests is displayed on the output portion;
   wherein the input portion of the query form comprises query form controls that are mapped to the XML data schema;
   wherein a first query form control comprises an instance of a control schema defined by an XML Schema Definition Language file and maps to a specific element of the XML data schema and identifies one or more subquery generators.

11. The method of claim 10, wherein the XML data schema may comprise one schema or multiple schema.

12. The method of claim 10, wherein the collection of data is stored in an XML format.

13. The method of claim 10, wherein a run-time engine includes the query assembler and a rendering engine.

14. The method of claim 13, wherein the rendering engine receives query results and transforms the query results using a transformation language.

15. The method of claim 14, wherein the rendering engine uses XSL to transform the query results.

16. The method of claim 10, further comprising receiving query parameters at query form pages, wherein the query form pages are generated from query form annotations and templates.

17. The method of claim 16, wherein the query form annotations include:
   a query input component, wherein the query input component comprises a selection of multiple controls and their relation to the data schema; and
   a query results component, wherein the query results component comprises a selection of the elements of the data schema to be presented in the results of the query.

18. The method of claim 16, wherein the templates contain presentation logic for displaying the query form pages in a web browser.

19. A non-transitory computer-readable medium containing instructions stored thereon, wherein the instructions comprise:
   using at least one XML data schema describing contents s of data to be queried, wherein a collection of data from multiple different databases that are not homogeneous is populated with instances of the at least one XML data schema, wherein the XML data schema is used to generate a query form user interface, wherein the query form user interface comprises an input portion and an output portion;
   generating query statements in XML Query Language through the use of at least one generator in response to user input in the query input user interface; and
   invoking from a query assembler to the generator to assemble and submit query requests received at the input portion to the multiple different databases for the execution of the specified query upon the collection of data, and wherein a response to the query requests is displayed on the output portion
   wherein the input portion of the query form comprises query form controls that are mapped to the XML data schema;
   wherein a first query form control comprises an instance of a control schema defined by an XML Schema Definition Language file and maps to a specific element of the XML data schema and identifies one or more subquery generators.

20. The non-transitory computer-readable medium of claim 19, wherein a run-time engine includes the query assembler and a rendering engine.

* * * * *

UNITED STATES PATENT AND TRADEMARK OFFICE
CERTIFICATE OF CORRECTION

| | | |
|---|---|---|
| PATENT NO. | : 7,860,877 B2 | Page 1 of 1 |
| APPLICATION NO. | : 11/689923 | |
| DATED | : December 28, 2010 | |
| INVENTOR(S) | : Michail A. Petropoulos et al. | |

It is certified that error appears in the above-identified patent and that said Letters Patent is hereby corrected as shown below:

On the cover page, item (56), in column 2, under "Other Publications", line 2, delete "Springe" and insert -- Springer --, therefor.

On the cover page, item (56), in column 2, under "Other Publications", line 2, delete "Hedeberg" and insert -- Heidelberg --, therefor.

In the drawings:
On sheet 9 of 11, in Figure 10, Ref. Numeral 1006, line 9, delete "COORDINTATING" and insert -- COORDINATING --, therefor.

In column 19-20, in Table 5, line 5, delete ""  proximity sensors" and insert -- "proximity_sensors --, therefor.

In column 19-20, in Table 5, line 6, delete "form name" and insert -- formname --, therefor.

In column 19-20, in Table 5, line 8, delete "Propertyname" and insert -- Property name --, therefor.

In column 19-20, in Table 5, line 10, delete "" category"" and insert -- "category" --, therefor.

In column 20, line 46, delete "11106)." and insert -- 1106). --, therefor.

In column 22, line 58, below "order." insert -- APPENDIX A --.

In column 23-24, line 46, delete "int Value( ));" and insert -- intValue( )); --, therefor.

In column 23, line 52, in claim 1, delete "A" and insert -- a --, therefor.

In column 26, line 40, in claim 19, after "portion" insert -- ; --.

Signed and Sealed this
Eighteenth Day of October, 2011

David J. Kappos
*Director of the United States Patent and Trademark Office*